United States Patent [19]

Beidler

[11] Patent Number: 4,517,262

[45] Date of Patent: May 14, 1985

[54] VENT FOR A STORAGE BATTERY

[75] Inventor: David B. Beidler, Gilbertsville, Pa.

[73] Assignee: General Battery Corporation, Reading, Pa.

[21] Appl. No.: 564,013

[22] Filed: Dec. 21, 1983

[51] Int. Cl.[3] .......................................... H01M 2/12
[52] U.S. Cl. ...................................... 429/87; 429/53; 429/89
[58] Field of Search ................ 429/53, 82, 84, 89, 429/87, 88

[56] References Cited

U.S. PATENT DOCUMENTS

| | | |
|---|---|---|
| 971,737 | 10/1910 | Ekstromer . |
| 1,010,695 | 12/1911 | Sloan . |
| 1,736,115 | 11/1929 | Ford . |
| 2,214,803 | 9/1940 | Wells ................................ 136/177 |
| 2,452,066 | 10/1948 | Murphy .............................. 136/179 |
| 2,690,467 | 9/1954 | Kendall .............................. 136/178 |
| 2,708,214 | 5/1955 | Galloway ........................... 136/177 |
| 2,743,035 | 4/1956 | Fogarty .............................. 220/88 |
| 2,790,570 | 4/1957 | Hodges et al. ...................... 215/56 |
| 2,835,720 | 5/1958 | Buskirk . |
| 2,858,354 | 10/1958 | Dickover ........................... 136/179 |
| 2,872,499 | 2/1959 | Rowls et al. ....................... 136/177 |
| 2,896,007 | 7/1959 | Buskirk ............................. 136/177 |
| 3,020,328 | 2/1962 | Jones ................................. 136/177 |
| 3,078,330 | 2/1963 | Slautterback ...................... 136/177 |
| 3,083,255 | 3/1963 | Slautterback ...................... 136/177 |
| 3,083,256 | 3/1963 | Slautterback ...................... 136/177 |
| 3,108,911 | 10/1963 | Miller ................................ 136/177 |
| 3,161,548 | 12/1964 | Goldingay ......................... 136/177 |
| 3,265,538 | 8/1966 | Lucas ................................ 136/177 |
| 3,284,244 | 11/1966 | Lucas ................................ 136/177 |
| 3,385,467 | 5/1968 | Lindenberg ........................ 220/44 |
| 3,466,199 | 9/1969 | Hennen .............................. 136/177 |
| 3,497,395 | 2/1970 | Kohen ................................ 136/178 |
| 3,879,227 | 4/1975 | Hennen .............................. 136/177 |
| 3,944,437 | 3/1976 | Auerbach ........................... 136/179 |
| 3,970,479 | 7/1976 | King .................................. 429/82 |
| 3,992,226 | 11/1976 | Godshalk ........................... 429/89 |
| 4,010,044 | 3/1977 | Schaumburg ....................... 429/82 |
| 4,052,534 | 10/1977 | Devitt ................................ 429/89 |
| 4,072,799 | 2/1978 | Leeson et al. ...................... 429/82 |
| 4,091,179 | 5/1978 | Szabo ................................ 429/84 |
| 4,113,925 | 9/1978 | Kohler et al. ...................... 429/78 |
| 4,168,350 | 9/1979 | Oxenreider et al. ................ 429/87 |
| 4,209,572 | 6/1980 | Reissland .......................... 429/53 |
| 4,294,895 | 10/1981 | Atkins ............................... 429/84 |
| 4,315,058 | 2/1982 | Schwendener et al. ............. 429/84 |
| 4,317,868 | 3/1982 | Spiegelberg ........................ 429/82 |
| 4,328,290 | 5/1982 | Szymborski et al. ............... 429/54 |
| 4,403,019 | 9/1983 | Poe ................................... 429/53 |

FOREIGN PATENT DOCUMENTS 972806  8/1975  Canada ............................. 319/122

OTHER PUBLICATIONS

Electrical Equipment in Mines, by H. Cotton, Front Page and p. 405.

Primary Examiner—Charles F. LeFevour
Attorney, Agent, or Firm—Benasutti and Murray

[57] ABSTRACT

A vent cap for enclosing filler openings of a storage battery comprises a base terminating at a rim including a generally U-shaped channel and a cover, the periphery of which engages the channel of the base. The periphery of the cover is provided with an essentially planar face having a chamfered termination and a plurality of circumferentially spaced, secant-shaped portions formed therein. The inner and outer faces of the cover are provided with reliefed portions adjacent to the secant-shaped portions formed in the cover's periphery. The secant-shaped portions formed in the periphery of the cover and the reliefed portions formed in the inner and outer faces of the cover cooperate with the U-shaped channel to develop a series of apertures between the base and cover.

20 Claims, 6 Drawing Figures

U.S. Patent  May 14, 1985  4,517,262
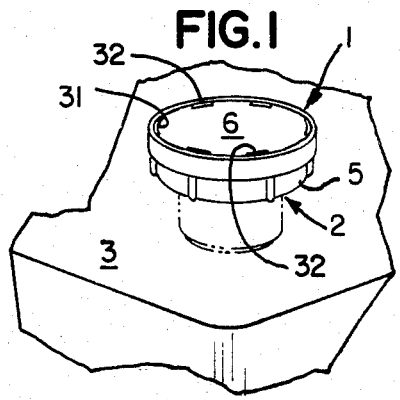
FIG. 1
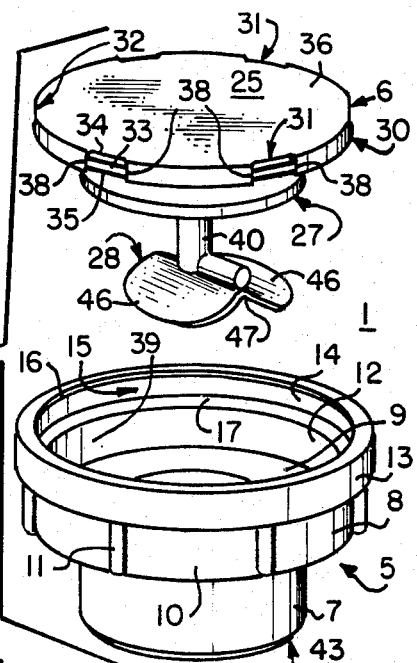
FIG. 2
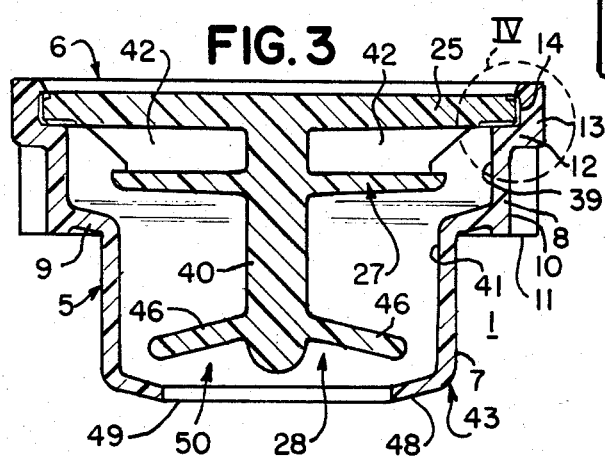
FIG. 3
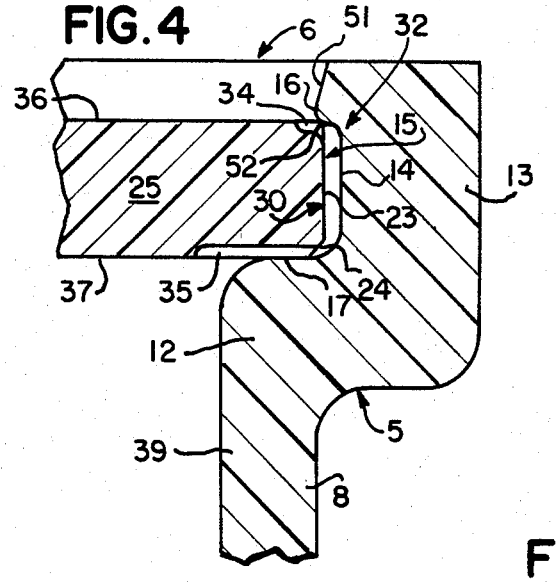
FIG. 4
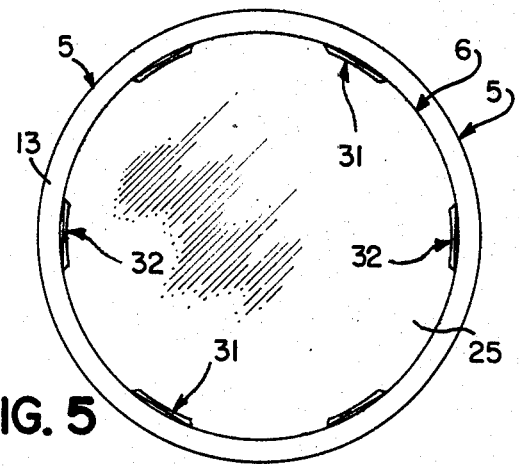
FIG. 6
FIG. 5

VENT FOR A STORAGE BATTERY

BACKGROUND OF THE INVENTION

The present invention relates generally to storage battery ventilation, and more particularly, to an improved vent for use in connection with conventional storage battery designs.

As a result of various chemical processes which occur when conventional storage batteries are in use, as well as during the charging of such storage batteries, gases such as hydrogen and oxygen are often produced. Such gases are generally vented to the atmosphere in order to relieve the battery of internal pressures which would otherwise result. In performing such ventilation, the following two factors should be considered.

First, since the gases being vented are hydrogen and oxygen, care must be taken to avoid the possibility of igniting such gases. This is particularly so during battery charging, since gassing becomes more prevalent during such periods, and since electrical connections made to the terminals of the battery can create a potential for sparks. Failure to adequately accommodate such conditions can result in sparks or ignited gases re-entering the battery, at times resulting in battery explosion.

Second, care must be taken to prevent the loss of battery electrolyte through the vent, either as a result of misting which occurs in connection with battery gassing, or as a result of battery movement. Otherwise, battery electrolyte levels must be carefully monitored and replenished, as needed, requiring additional servicing procedures and often compromising the service life of the battery.

A variety of devices have been developed in an attempt to accommodate the foregoing difficulties by providing a vent cap which is both safe and reliable in operation, yet inexpensive in manufacture. In an effort to prevent sparks and ignited gases from re-entering the battery, such vent caps are generally provided with proportioned apertures or slits which are sufficiently large to enable the safe ventilation of gases from the battery, yet which are sufficiently small to prevent the passage of sparks or ignited gases. To prevent the loss of electrolyte, such vent caps are generally provided with baffles or passageways which develop relatively contorted flow paths designed to condense and facilitate the return of electrolyte collected within the vent cap to the cell of the battery with which the vent cap is associated.

Although providing adequate operation in many circumstances, such vent caps have often been found to be unacceptable from a manufacturing standpoint. In particular, it has generally been found difficult to accurately maintain the dimensions of the apertures or slits provided to ventilate gases to the atmosphere, as well as to produce the baffles or passageways provided to control the escape of electrolyte. Simplifying the vent cap's structure would enable reductions in manufacturing costs, but has generally been found to unacceptably compromise safety and reliability in operation.

The need therefore remained to develop a safe and reliable vent cap which is sufficiently simple in construction to enable its manufacture at reasonable cost.

SUMMARY OF THE INVENTION

It is therefore a primary object of the present invention to provide an improved vent for use in connection with storage batteries.

It is also an object of the present invention to provide a vent cap for a storage battery which is capable of efficiently ventilating gases from the battery to the atmosphere.

It is also an object of the present invention to provide a vent cap for a storage battery which is capable of efficiently ventilating gases to the atmosphere, and which is also capable of preventing the possibility of sparks of ignited gases from re-entering the storage battery through the vent cap.

It is also an object of the present invention to provide a vent cap for a storage battery which assists in preventing the loss of electrolyte from the storage battery.

It is also an object of the present invention to provide a vent cap for a storage battery which is capable of condensing and collecting escaping electrolyte, for return to the storage battery.

It is also an object of the present invention to provide a vent cap for a storage battery which is efficient and reliable in operation, yet which is inexpensive in cost.

These and other objects are achieved in accordance with the present invention by providing a vent cap having a base and cover of improved construction. Terminal portions of the base are provided with a configured channel or groove incorporating a transverse ledge capable of receiving the cover. The cover is provided with a series of ventilating passageways disposed about its periphery, each including a secant-shaped portion provided in the periphery of the cover, and relieved portions provided in the inner and outer face of the cover adjacent to the secant-shaped portions. Upon assembly, the periphery of the cover is located within the channel or groove of the base so that the lowermost face of the cover is seated on the transverse ledge.

To promote safe and efficient gas ventilation, the relieved portions combine with the secant-shaped portions of the cover to develop a series of ventilating apertures disposed about the circumference of the resulting assembly, providing a multiplicity of means for effectively ventilating gases in connection therewith. The relieved portions of the cover cooperate with the channel or groove of the base to prevent sparks and ignited gases from passing through the assembled vent cap by sealing the ventilating aperture involved as a result of heat produced by the spark or ignited gases.

To promote electrolyte retention, the bottom of the base is provided with an enlarged aperture, and the cover is provided with one or more baffles depending therefrom which cooperate with the enlarged aperture of the base to efficiently and reliably entrap, condense and return electrolyte to the battery. As a further improvement, the lower most baffle includes portions which progress downwardly toward the enlarged aperture of the base, developing a generally concave member for entrapping and condensing escaping gases, and for facilitating the return of condensed electrolyte to the battery.

For further detail regarding the present invention, reference is made to the following detailed description of a preferred embodiment of the invention, taken in conjunction with the following illustrations.

BRIEF DESCRIPTION OF THE DRAWINGS

FIG. 1 is a partial, perspective view illustrating a preferred embodiment vent cap in combination with a storage battery.

FIG. 2 is an exploded, perspective view of the vent cap illustrated in FIG. 1.

FIG. 3 is a cross-sectional view of the vent cap illustrated in FIG. 1.

FIG. 4 is an enlarged, partial cross-sectional view of the area of the vent cap illustrated at IV in FIG. 3.

FIG. 5 is a top plan view of the vent cap illustrated in FIG. 1.

FIG. 6 is a bottom plan view of the cover of the vent cap illustrated in FIG. 1.

In the several views provided, like reference numerals denote similar structure.

DETAILED DESCRIPTION OF THE PREFERRED EMBODIMENT

Although specific forms of the invention have been selected for illustration in the drawings, and the following description is drawn in specific terms for the purpose of describing these forms of the invention, this description is not intended to limit the scope of the invention which is defined in the appended claims.

FIG. 1 illustrates a preferred embodiment vent cap 1 produced in accordance with the present invention, enclosing a single filler opening 2 of a storage battery 3. Although not shwon, it will be understood that the storage battery 3 may have other filler openings, depending upon the number of cells which the storage battery 3 incorporates, and that each such filler opening may be enclosed by another vent cap of essentially similar construction to the vent cap 1 illustrated in FIG. 1. It will further be understood that although a single-vent cap construction has been selected for illustration and description, the present invention will also find applicability in connection with gang vent constructions capable of simultaneously engaging a plurality of filler openings of the storage battery.

With reference to FIGS. 2 and 3, the vent cap 1 generally comprises a base 5 and cover 6 which are mechanically interconnected to develop a cooperating assembly as will be more fully described below.

The base 5 includes two generally cylindrical portions 7, 8 separated by a sloping shelf 9. The lowermost cylindrical portion 7 is provided with a diameter which essentially corresponds to the diameter of the filler opening 2 of the storage battery 3. By establishing a correct tolerance between the cylindrical portion 7 and the filler opening 2, it is possible to provide a vent cap 1 which is capable of frictionally engaging the filler opening 2, if desired. Alternatively, the outer periphery of the cylindrical portion 7 may be provided with threads capable of cooperating with threads associated with the filler opening 2, if desired. Regardless of the configuration used, the interconnection between the cylindrical portion 7 and filler opening 2 should be sufficiently tight to assure a secure assembly.

The cylindrical portion 8 is provided with a diameter which preferably exceeds the diameter of the cylindrical portion 7 as shown. The outer periphery 10 of the cylindrical portion 8 is preferably provided with a series of ribs 11 which facilitate engagement and rotation of the base 5 with respect to the filler opening 2, for ease of installation and removal.

The terminating periphery 12 of the cylindrical portion 8 is provided with a rim 13, which serves as a means for engaging the cover 6 of the assembly as will be more fully described below. To this end, the rim 13 incorporates an essentially U-shaped channel 14 which extends fully about the circumference of the rim 13 to define a structure receiving cavity 15. The channel 14 is defined at one end by a detent 16 which circumferentially projects from the rim 13 as shown, and at the other end by a transverse ledge 17 which circumferentially extends between the rim 13 and the cylindrical portion 8.

The cover 6 generally includes a disk 25 and a plurality of baffles 27, 28 depending from the disk 25.

The disk 25 is essentially planar in configuration, having a periphery 30 which is capable of cooperating with the rim 13 of the base 5 to provide mechanical interconnection between the base 5 and cover 6. As is best illustrated in FIGS. 2 and 4, the face 23 of the periphery 30 of the disk 25 is essentially planar, incorporating a chamfered termination at 24 as shown, and a series of ventilation means 31 disposed about the periphery 30 of the disk 25. Each ventilation means 31 takes the form of an aperture 32 defined by a secant-shaped portion 33 spanning the periphery of the disk 25 in combination with relieved portions 34, 35 formed in the outer face 36 and inner face 37 of the disk 25, respectively, adjacent the secant-shaped portion 33.

With reference to FIGS. 4 and 5, each relief 34 associated with the outer face 36 of the disk 25 is preferably essentially trapezoidal in shape, with its broadest side extending between terminating edges 38 of the secant-shaped portion 33. The remainder of the trapezoidal relief 34 extends inwardly from the periphery of the disk 25, to a position beyond the edge of the detent 16, as well as the edge of the secant-shaped portion 33. With reference to FIGS. 4 and 6, each relief 35 associated with the inner face 37 of the disk 25 also extends from and between the edges 38 of the secant-shaped portion 33, from the chamfer 24 and inwardly along the face 37, to a position beyond the innermost wall 39 of the cylindrical portion 8.

A stem 40 depends from essentially centrally disposed portions of the disk 25, and serves as a means for supporting the baffles 27, 28 beneath the disk 25 as shown. With reference to FIG. 3, a first baffle 27 is located beneath the disk 25, within the cylindrical portion 8 of the base 5. The baffle 27 is preferably essentially planar, extending radially from the stem 40 to a point beyond the innermost wall 41 of the cylindrical portion 7. To provide increased support for the baffle 27, a series of gussets 42 are provided which transversely extend between the disk 25 and baffle 27.

A second baffle 28 is located at the end of the stem 40, within the cylindrical portion 7. Again, the baffle 28 extends outwardly from the stem 40, however, unlike the baffle 27, the baffle 28 preferably incorporates a pair of hemispherical members 46, each of which extend from the stem 40 at an angle which progresses downwardly from the interface 47 between the hemispherical members 46 toward the lower end 43 of the base 5. The end 43 of the base 5 is provided with a cooperating enclosure member 48 which extends inwardly from the cylindrical portion 7 to define a restricted aperture 19 adjacent the baffle 28. The hemispherical members 46 preferably extend outwardly from the stem 40 to a position which lies beyond the perimeter of the aperture 49, developing a concave cavity 50 beneath the baffle 28.

Assembly of the vent cap 1 is simply accomplished by placing the periphery 30 of the disk 25 within the channel 14 of the rim 13. The various components comprising the disk 25 and rim 13 combine to develop a snap-fit at this interface. To further facilitate assembly, the exposed face 51 of the detent 16 is provided with a slope which facilitates passage of the periphery 30 across the detent 16.

Upon assembly, the outer edge 52 of the disk 25 is placed in contact with the detent 16 of the channel 14, and the lower face 37 of the disk 25 is placed in contact with the transverse face 17 of the channel 14, securely retaining and seating the disk 25 in position within the channel 14. The secant-shaped portions 33, in combination with the reliefs 34, 35 associated with each of the ventilation means 31 provided will automatically develop the apertures 32 used to ventilate gases from the interior of the vent cap 1 to the atmosphere.

The foregoing assembly serves to reliably and efficiently ventilate gases from the storage battery 3, in addition to safely preventing against the possibility of sparks or ignited gases from re-entering the storage battery (flashback), as a result of cooperation between the various components comprising the assembly.

For example, the ventilation of gases is enabled through the apertures 32 associated with each of the ventilation means 31. To promote efficient ventilation, a plurality of ventilation means 31 are preferably provided, six regularly spaced ventilation means 31 being shown in the illustrative example. To prevent the possibility of flashback, the apertures 32 are provided with a width which is adequate for correct gas ventilation, yet which is sufficiently narrow to promote fusion between adjacent portions of the base 5 and cover 6 upon exposure to a spark or ignited gases. Generally, widths lying in a range of from no less than 0.003 inches to no more than 0.007 inches are suitable in this regard. For example, in its preferred embodiment, each relief 34, 35 is separated from adjacent portions of the rim 13 by a spacing of approximately 0.004 inches, while the broadest distance between the face of the secant-shaped portion 33 of the disk 25 and the rim 13 is approximately 0.007 inches. Providing the reliefs 34, 35 with a gap on the order of 0.004 inches has been found to be particularly beneficial in promoting the fusion of polypropylene parts when exposed to a spark or ignited gases. It will therefore be understood that while the foregoing parameters are considered preferred, variations of these parameters may be deemed necessary for use in connection with some applications, particularly those involving battery constructions comprising different materials.

It will be noted that upon exposure to a spark or ignited gases, while one or more of the ventilation means 31 will be fused closed, other ventilation means 31 provided will remain available to safely vent gases to the atmosphere during subsequent battery operations. Thus, the vent cap 1 of the present invention not only provides protection against the possibility of flashback and battery explosion, but does so without unduly compromising subsequent ventilation. It should be noted that further security in this reeard is developed by separately providing a first relief 34 having a width on the order of 0.004 inches, acting as a first means for sealing off a potential source of flashback, as well as a second relief 35 having a width on the order of 0.004 inches, providing a second, independent means for sealing off a potential source of flashback. It will further be noted that all of the foregoing operational improvements are automatically developed upon assemblying the base 5 and cover 6.

Regarding electrolyte retention, the baffles 27, 28 combine to efficiently collect, condense and return electrolyte to the battery during its operation as follows.

The baffle 28 operates in connection with the aperture 49 to provide a barrier to the escape of splashing electrolyte. Turbulance developed in this vicinity also serves to promote the condensation of electrolyte on the baffle 28, for subsequent return to the battery. The sloping configuration of the baffle 28 and enclosure member 48, as well as the relatively large size of the aperture 49, further combine to promote the return of electrolyte to the battery and to preclude development of capillary action which could tend to draw electrolyte from the battery, a condition which is often encountered in connection with conventional vent cap designs.

Use of the baffle 27, although optional, is preferred to further promote collection, condensation and return of electrolyte to the battery. The baffle 27 has been found to be particularly useful during severe or high rate gassing such as is encountered in connection with heavy use or charging applications. Again, return of the condensed electrolyte is facilitated by the sloping shelf 9 separating the cylindrical portions 7, 8, as well as the sloping configuration of the enclosure member 48 and the enlarged aperture 49.

It will therefore be seen that the vent cap 1 previously described serves well to satisfy each of the objectives previously set forth. It will also be understood that the vent cap 1 described is capable of variation without departing from the spirit and scope of the present invention.

For example, as previously indicated, the peripheral configuration of the base 5 may be varied to cooperate with different storage battery constructions, including variations in the cylindrical portion 7, as well as the cylindrical portion 8. Use of the intermediate baffle 27, although preferred, is also optional. Additionally, the present invention will find applicability in connection with gang vent designs, as well as single vent designs.

The number of ventilation means 31 provided in connection with the vent cap 1 may also be varied, as may their relative spacing about the periphery 30 of the disk 25. The configuration of the baffles 27, 28 may also be varied. For example, rather than providing the lowermost baffle 28 with a pair of depending hemispherical members 46 as shown, the lower baffle 28 may be formed as a series of four cooperating depending members, or a conically shaped depending member, as desired.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A vent cap for enclosing a filler opening of a storage battery, comprising:
    (a) a generally cylindrical base portion adapted at a first end thereof to enter into and to engage the filler opening and terminating at the other end thereof in a rim including an inwardly disposed, essentially U-shaped channel said first end further having a closure member which extends inwardly and defines an aperture which is less in diameter than the diameter at said rim, with the cylinder being unrestricted as it extends from said first end toward said rim; and (b) a cover portion having a periphery engaging the channel of the base portion and a downwardly depending member which terminates a first baffle means which project outwardly from the depending stem at an angle which progresses generally away from the cover portion and toward the aperture defined in said closure member;

(c) wherein the periphery of the cover portion incorporates an essentially planar face having a chamfered termination and a plurality of circumferentially spaced shaped portions formed therein; and (d) wherein the shaped portions cooperate with the channel to develop a plurality of apertures disposed about the interface between the base portion and the cover portion.

2. The vent cap of claim 1 wherein six regularly spaced apertures are developed at the interface.

3. The vent cap of claim 2 wherein a first relieved portion is formed in an outer face of the cover portion, and a second relieved portion is formed in an inner face of the cover portion.

4. The vent cap of claim 2 wherein a pair of members projecting from the rim of the base portion combine to define the channel, and wherein portions of the inner and outer faces of the cover portion adjacent to the relieved portions contact the projecting members.

5. The vent cap of claim 4 wherein the projecting members defining the channel include detent means located at one end of the rim, and a transverse face extending between another end of the rim and the base portion.

6. The vent cap of claim 4 wherein each relieved portion extends along the face of the cover portion to a position beyond the edge of the adjacent, contacted projecting member.

7. The vent cap of claim 6 wherein the relieved portion associated with the lower face of the cover portion extends from the chamfered termination of the periphery of the cover portion.

8. The vent cap of claim 6 wherein the relieved portion associated with the upper face of the cover portion is essentially trapezoidal in shaped, with its broadest edge spanning the secant-shaped portion.

9. The vent cap of claim 2 wherein the cover portion includes a second baffle means depending from the cover portion.

10. The vent cap of claim 1 wherein the first baffle means includes two essentially hemispherical baffle portions.

11. The vent cap of claim 10 wherein the first baffle means projects over portions of the enclosure member defining the aperture therein.

12. The vent cap of claim 11 wherein a second baffle means is positioned adjacent to the cover portion and extends essentially radially outwardly from the stem.

13. The vent cap of claim 12 wherein a plurality of gussets interconnect the cover portion and the second baffle means.

14. The vent cap of claim 12 wherein the second baffle means is associated with an enlarged cavity formed in the base portion adjacent to the rim.

15. The vent cap of claim 14 wherein the diameter of the cavity is greater than the diameter of the filler opening engaging portions of the base portion.

16. The vent cap of claim 15 wherein the diameter of the second baffle means is greater than the diameter of the filler opening engaging portions of the base portion.

17. The vent cap of claim 15 wherein the cavity is separated from the filler opening engaging portions by a generally downwardly sloping shelf.

18. A vent cap for enclosing a filler opening of a storage battery, comprising:

(a) a generally cylindrical base portion adapted at a first end thereof to enter into and to engage the filler opening and terminating at the other end thereof in a rim including an inwardly disposed, essentially U-shaped channel said first end further having a closure member which extends inwardly and defines an aperture which is less in diameter than the diameter at said rim, with the cylinder being unrestricted as it extends from said first end toward said rim; and (b) a cover portion having a periphery engaging the channel of the base portion and a downwardly depending member which terminates a first baffle means which project outwardly from the depending stem at an angle which progresses generally away from the cover portion and toward the aperture defined in said closure member;

(c) wherein the periphery of the cover portion incorporates an essentially planar face having a chamfered termination and a plurality of circumferentially spaced shaped portions formed therein, wherein the shaped portions formed in the periphery of the cover portion include:

(i) a secant-shaped portion formed in the face of the periphery of the cover portion; and (ii) a plurality of relieved portions formed in faces of the cover portion adjacent to the secant-shaped portion; and (d) wherein the shaped portions cooperate with the channel to develop a plurality of apertures disposed about the interface between the base portion and the cover portion.

19. The vent cap of claim 18 wherein the broadest distance between the secant-shaped portion of the cover portion and the rim of the base portion is approximately 0.007 inches.

20. The vent cap of claim 18 wherein the depth of the relieved portions is approximately 0.004 inches.

* * * * *